July 27, 1937.   S. TIJMSTRA   2,088,497
PROCESS AND APPARATUS FOR CONTACTING FLUIDS
Filed Dec. 4, 1934
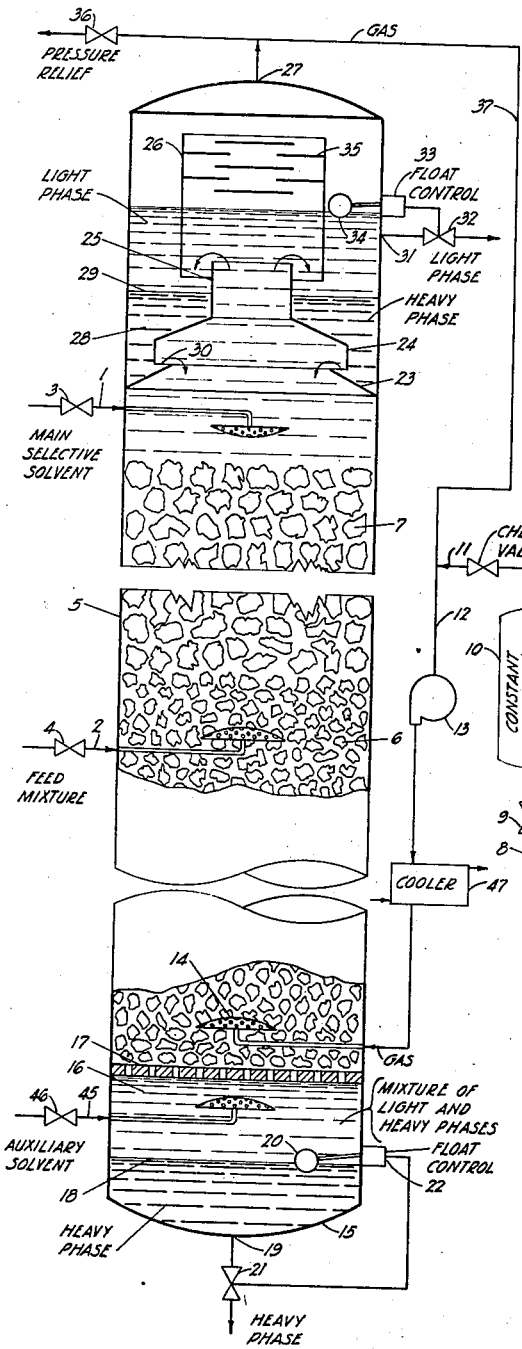
Fig. I
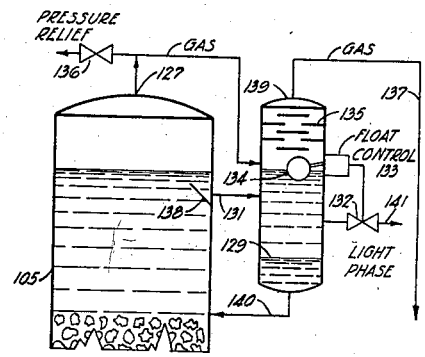
Fig. II
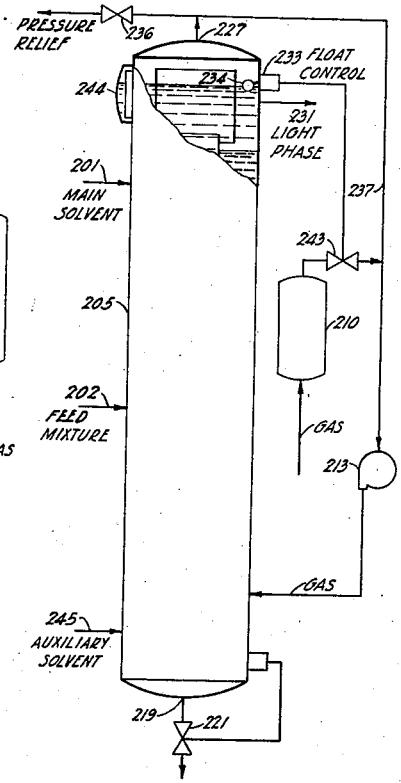
Fig. III
Inventor: Sijbren Tijmstra
By his Attorney:

Patented July 27, 1937

2,088,497

UNITED STATES PATENT OFFICE 2,088,497

PROCESS AND APPARATUS FOR CONTACTING FLUIDS

Sijbren Tijmstra, Berkeley, Calif., assignor to Shell Development Company, San Francisco, Calif., a corporation of Delaware Application December 4, 1934, Serial No. 755,871

7 Claims. (Cl. 196—13)

This invention relates to the art of contacting two liquids for the purpose of achieving a chemical or physical interaction between them. My improved process and apparatus may be used with advantage in connection with any process of installation which involves the countercurrent flow of two liquids or liquid phases. Examples of such processes are the solvent extraction of liquid mixtures, such as hydrocarbon mixtures, mixtures of organic acids and water, and other mixtures or solutions; the acid treatment of mineral oils or other liquids; the neutralization of solutions, etc.

It is an object of my invention to provide an improved process and apparatus for contacting two liquids flowing countercurrently through a zone provided with contact means, in which channeling will be avoided or reduced, and/or in which the two liquids are brought into more intimate contact than has been possible with the known processes. It is a further object of my invention to provide an apparatus which will be automatic in operation and which will be economical to operate. Other objects of my invention will be apparent from a reading of the specification.

It is known to contact the liquids by introducing them at vertically spaced points of a column or tower, and withdrawing the products at other vertically spaced points. With a view of obtaining a better contact between the two liquids it has been proposed to provide the tower with contact means. The disadvantage of such an installation, however, is that channeling is likely to occur. In this condition one liquid or phase flows upwardly in small streams in certain parts of the tower, and the other liquid or phase flows downwardly in similar streams, but in other parts of the tower, thereby preventing effective contact between them.

I have found that in contacting liquids in a chamber provided with contact means, channeling can be prevented and that the liquids can be brought into much more effective contact by passing a gas upwardly through all or a part of the length of a substantially vertical tower. It is an essential feature of my improved process that the gas agitates the liquids or phases while they flow countercurrently in a contact zone which has been provided with suitable contact means. By the term "contact zone" I mean the space within a column or other container in which the two liquids or phases of differing specific gravity flow countercurrently while in intimate contact with each other. The contact means may consist of any suitable packing material, as described below, or a series of perforated plates which will aid in bringing the two liquids into effective contact. The settling zone may consist of a single column or tank, or of a series of such apparatus.

In this specification and drawing, I have illustrated three forms of apparatus which are suitable for carrying out my process, but it is to be understood that the invention is not limited to such forms, because it may be embodied in other forms which will be apparent to those skilled in the art.

In the drawing, Figure I is a longitudinal sectional view of one preferred embodiment of the apparatus; Figure II is a fragmentary view, similar to Figure I, showing a modified form of the apparatus; and Figure III is an elevation, partly in section, showing a modified level control arrangement. For convenience, I shall describe my invention in relation to a solvent extraction system, but it is to be understood that it may be applied to other liquid contact treatments.

Referring to Figure I of the drawing, the liquids to be contacted are introduced through inlets 1 and 2, controlled by valves 3 and 4 respectively, into a packed tower 5. Suitable spiders or nozzles may be provided to distribute the liquids in the tower. The tower 5 may be filled in its lower part with relatively small packing material 6, and at its upper part with larger packing material 7. According to one embodiment of my invention the lower portion of the tower may be packed with small balls, and the upper portion with larger rings. I may, however, substitute therefor any suitable contact means, such as perforated rings, plates or discs, Raschig rings, coke, pebbles, or any honeycombed, perforated or porous material. A gas, preferably one which is inert in relation to the liquids in the tower, flows through a pipe 8 and valve 9 into a constant pressure storage tank 10. The gas enters the contact apparatus through a check valve 11, conduit 12, pump 13, and is discharged through a nozzle 14, located at any desired point in the tower.

The heavier phase produced in the column 5, flows downwardly through the packing 6 and 7, and the lighter phase flows upwardly, countercurrently to and in intimate contact with the heavier phase. The gas agitates the mixture, and produces a turbulence which causes an effective contacting of the two phases. This turbulence has the further effect of preventing channeling. The flow of gas will normally retard the relative movement of the two liquid phases. Its rate must, however, be regulated, because an excessive flow of gas may entirely prevent the counter-current movement.

Although it is possible to pack the tower so as to cause the packing material to rest directly on the bottom 15, I prefer to arrange the packing in a manner to provide an unobstructed settling zone 16 near the bottom of the column. This may be accomplished by supporting the packing material 6 on a perforated plate 17.

The heavier phase produced in the column flows downwardly through the packing and accumulates in the settling zone 16, which is free from turbulence. In this quiescent zone, the entrained drops of the lighter phase coalesce and flow upwardly, thereby causing stratification. The liquid above the interphase 18, will be a mixture of the heavier extract phase and of the lighter phase, while the liquid below this interphase will consist substantially of pure extract phase, which is withdrawn through an outlet 19. To insure the withdrawal of extract phase of the desired composition a float 20, designed to rise and fall with the interphase 18 is arranged to control throttle valve 21 by means of a valve actuating system 22.

The lighter phase and the gas which rise in the column are in a state of turbulence; they form a mixture which usually contains a certain quantity of entrained heavier liquid which should form a part of the heavier phase. This turbulent mixture is guided by the truncated conical baffles 23 and 24 into a cylindrical chimney 25, which is surrounded by a cylindrical baffle 26, extending at least as far down as the upper edge of the chimney 25. This arrangement permits the gas to rise inside of the baffle 26 to the top of the column 5, where it is withdrawn through an outlet 27. At the same time it permits the liquids to enter a quiescent annular settling zone 28 where the phases may stratify, producing an interphase 29. The liquid phase below this interphase contains heavier components of the system, and flows back into the extraction zone through an annular opening 30. The liquid above interphase 29 consists of the lighter phase of the system, and is withdrawn through an outlet 31, regulated by a throttle valve 32. This valve is actuated by the valve actuating system 33 and controlled by the float 34, which floats on the surface of the liquid in the column.

The gas may be freed from entrained liquid by means of baffles 35, or it may be passed through an outside liquid separator. A safety pressure relief valve 36 may be provided. The gas flows through a conduit 37, and is re-introduced at 14 by means of the pump 13.

The system may be operated at any desired pressure, either above or below atmospheric. The operating pressure is determined by the pressure in the reservoir 10, in the following manner: In the course of the operation certain amounts of gas are lost by being dissolved or entrained in the treated liquid. Since the float controls maintain a constant volume of liquid in the system, the loss of gas causes a lowering of the pressure in the column. Whenever the pressure in the top of the column and in the conduit 37 falls below that in the tank 10, check valve 11 permits additional gas to enter the system. The throttle valves 21 and 32, and the check valve 11 in this manner insure automatic maintenance of the liquid level and of the pressure in the system.

The time required for proper stratification of the liquids in the settling zone 28 will frequently be so great as to require an excessively large settling zone. It will in these situations be more feasible to provide an auxiliary settling chamber, which may be of any desired size, not dependent upon the cross section of the column 5, and which may also serve as a gas separator. Such a construction is indicated in Figure II, showing the upper portion of a modified column 105, provided with a gas outlet 127, relief valve 136, and liquid outlet 131. A baffle 138 may be arranged in the column so as to prevent the withdrawal of substantial amounts of gas through the outlet 131. The light phase, containing certain amounts of entrained gas and heavier liquid, is introduced into a settling apparatus 139, which is free from turbulence, and permits gas to leave the liquid. The entrained heavier phase settles below the interphase 129 and is returned to the column 105 by a conduit 140. The light phase is withdrawn through a conduit 141 which is regulated by a throttle valve 132, actuated by a valve actuating system 133 and controlled by a float 134, which may be located either in the apparatus 139 or in the column 105. The gas withdrawn at 127 may, likewise, be introduced into the apparatus 139, and be freed from entrained liquid by passing between baffles 135, and be withdrawn through an outlet 137.

Figure III illustrates a modified arrangement of the liquid and gas valves, whereby the level of the liquid is controlled in a novel manner. The extraction column 205, inlets 201 and 202, outlets 219, 227 and 231, valves 221 and 236, and pump 213 are similar to the corresponding elements described in connection with Figure I, and bearing corresponding reference characters. The rate at which the liquid is discharged from the outlet 231 will depend upon the pressure within the column 205. This, in turn, depends upon pressure in the conduit 237. To regulate this pressure a throttle valve 243 is provided to admit gas from a storage tank 210 which may contain gas at any pressure.

The level of the liquid in the tower 205 may be controlled manually by observing the sight gauge 244 and operating the valve 243. Alternatively, any suitable automatic means may be provided. For example, the column 205 may be provided with a float 234, which will operate the valve 243 by means of the valve actuating system 233. An auxiliary solvent may be introduced through inlet 245.

Many applications of my process for contacting two substances will be apparent to those skilled in the art, and I am not thus limited to any particular use of my process, although a few examples of its application will be given. For example, the apparatus and process find utility in the treatment of petroleum and its products with sulfuric acid. In this operation sulfuric acid is introduced through the inlet 1, and a petroleum fraction, such as gasoline, kerosene, gas oil, lubricating oil, etc., is introduced through the inlet 2. An inert gas, preferably nitrogen, is introduced through the inlet 8, and the nozzle 14. The spent acid and treated mineral oil fraction are withdrawn through the outlets 19 and 31, respectively. Furthermore, a liquid or solution may be effectively washed by the use of my process and apparatus. Examples of this type are numerous, and include the washing of a liquid with an alkali solution after acid treatment of the liquid, the washing of vegetable oils, as in the soap industry, the washing of tar to remove ammoniacal liquor, the washing of oils to free them of phenols, etc.

My invention finds especial application in the art of extracting liquid mixtures with selective solvents. For example, hydrocarbon oils may be extracted in accordance with my invention. To remove naphthenic and aromatic components therefrom, the oil is caused to flow countercurrently to a suitable selective solvent, such as liquid sulfur dioxide, "Chlorex" or $\beta\beta'$ dichlorethyl ether, furfural, phenol, nitrobenzene, quinoline, isoquinoline, alcohol, diacetone alcohol, etc., or solvent mixtures, thereby producing raffinate and extract phases, which are removed at opposite ends of the tower. If the extract phase is heavier, the solvent and the oil are introduced at 1 and 2, respectively, and the extract and raffinate phases are withdrawn at 19 and 31, respectively. When the extract phase is lighter than the raffinate phase, solvent is usually introduced at 2, and extract phase is withdrawn at 31. The use of an auxiliary solvent having a favorable effect in the distribution of oil components in extract and raffinate phases may under certain conditions be desirable. When used, it may be introduced into the tower near the point at which the extract phase is withdrawn. An inlet 45 controlled by a valve 46 may be used for this purpose. In the extraction of lubricating oils, light naphthas, gasoline or kerosene are suitable auxiliary solvents. Instead, a backwash consisting of the final extract may also be used. In any of these modes of operation, the gas, which may, for example, be nitrogen, produces a better contact and prevents channeling.

The improved results are apparent from the following example:

The lower two-thirds of a vertical tower having a diameter of 1½ inches and a height of 9 feet was filled with 4 mm. diameter glass beads, and the remainder with 6 mm. diameter glass rings. A selective solvent mixture consisting of 3 parts of furfural and 1 part of benzol was introduced at the top of the tower and an auxiliary solvent, consisting of isopentane, was introduced at the lower end of the tower. Oil was introduced at a point about 3 feet from the bottom. In experiment 1, nitrogen was introduced at the bottom of the tower at a rate sufficient to cause the required turbulence, but not sufficient to prevent the countercurrent flow of the liquid phases. In experiment 2, no gas was used. The data of the two experiments are tabulated below:

| Exp. No. | Charged to apparatus in c. cm. | | | Raffinate | | | |
|---|---|---|---|---|---|---|---|
| | Iso-pentane | Blend furfural-benzol | Oil | Yield per cent | S. Vis. 100° F. | S. Vis. 210° F. | V. I. acc. Dean and Davis |
| 1 | 810 | 5349 | 536 | 45.6 | 663 | 64.3 | 64 |
| 2 | 960 | 11036 | 504 | 38.8 | 667 | 64.1 | 63 |
| Properties of oil charged | | | | | 2080 | 79.3 | −59 |

From the tabulation it is evident that the introduction of gas caused better contact between the two liquid phases and that due to the increased efficiency of the extraction a higher yield of the same quality of raffinate was produced with the consumption of less than half the amount of solvent required for the experiment which omitted the use of gas.

Numerous modifications of my apparatus to meet specific conditions will be apparent to those skilled in the art. Thus, the valve control systems may be operated electrically, instead of by the floats shown. The inlet 45 could, similarly, be located so as to introduce the auxiliary solvent at a point below the interphase 18.

The tower may, further, be provided with coils or a jacket for providing a gradual temperature gradient, from a low temperature near the extract phase outlet to a higher temperature at the opposite end of the zone, thereby further improving the extraction efficiency. This feature is known in the extraction art and a further detailed description is unnecessary.

I may further use the gas to control the temperature in the tower by introducing a refrigerant heat exchanger 47.

As used in the present specification and claims the term "solvent" is intended to include solvent mixtures. The term "component" is not limited to pure substances, but is intended to include groups of substances which exhibit similar properties in relation to a selective solvent. There is no difference between the terms "liquid", "liquid mixture" and "solution".

I claim as my invention:

1. The process for bringing two at least partially immiscible liquids of different specific gravities into intimate contact which comprises: flowing the heavier liquid downwardly in a contact zone of a contact tower through contact means, flowing the lighter liquid upwardly through said contact means thereby producing heavy and light liquid phases, introducing a current of inert gas near the lower end of said contact zone in a quantity sufficient to cause effective turbulence in said zone but not sufficient to prevent countercurrent movement of the liquids, withdrawing the heavier phase near the lower end of said tower, withdrawing the lighter phase near the upper end of said tower, regulating the rate of withdrawal of said lighter phase by valve means operated to permit flow of said lighter phase in quantities to maintain the level of the liquid at a predetermined level below the top of the tower, withdrawing the gas at the upper end of the tower, recirculating at least a portion of the gas into the lower end of said zone through a gas conduit means and admitting additional gas at a constant pressure into the gas conduit means so as to maintain a substantially constant pressure at the top of said contact tower.

2. The process for bringing two at least partially immiscible liquids of different specific gravities into intimate contact which comprises: flowing the heavier liquid downwardly in a contact zone of a contact tower through contact means, flowing the lighter liquid upwardly through said contact means thereby producing heavy and light liquid phases, introducing a current of inert gas near the lower end of said contact zone in a quantity sufficient to cause effective turbulence in said zone but not sufficient to prevent countercurrent movement of the liquids, withdrawing the heavier phase near the lower end of said tower, withdrawing the lighter liquid near the upper end of the tower in response to the pressure prevailing within said tower, withdrawing the gas at the upper end of said tower, recirculating at least a portion of the gas into the lower end of said zone, and maintaining the level of the liquid at a level below the top of the tower by admitting additional gas into the tower when the liquid is above a desired level, and admitting less additional gas when the liquid is below a desired level.

3. In combination, a countercurrent treating apparatus comprising a contact zone, means within said zone for aiding the contacting of liquids, a first inlet means for introducing liquid near one end of the zone, a second inlet means for introducing a second liquid at a point in said zone removed from said first inlet means, a gas nozzle in said zone located in substantial spaced relation to the top of said zone, pump and conduit means for supplying gas under pressure to said gas nozzle, outlet means near opposite ends of said apparatus for withdrawing liquid phases from said apparatus, the upper outlet means being spaced from the top of the apparatus, a throttling valve in the said upper opening, a float controlled means for actuating said valve to maintain the liquid in the apparatus at a predetermined level below the top of said apparatus and above the said upper liquid outlet means, an outlet means at the top of said apparatus for withdrawing gas from the top of the apparatus, conduit means for conducting withdrawn gas from the top of the apparatus to the pump, a source of gas under constant pressure, and valve and conduit means arranged to admit gas from said source to the said pump and conduit means when the pressure in the latter falls below a predetermined value.

4. In combination, a countercurrent treating apparatus, comprising a contact zone, means within said zone for aiding the contacting of liquids, means for introducing a liquid near one end of the zone, means for introducing a second liquid at an intermediate point of the zone, a gas nozzle in the zone in substantial spaced relation to the top of the zone, a source of gas, valve means for regulating the supply of gas, pump and conduit means connecting said nozzle and valve means for supplying gas to said nozzle, a first outlet means near the lower end of the apparatus for withdrawing a heavier liquid phase, a second outlet means near the top of said apparatus for withdrawing the lighter liquid phase from the apparatus, outlet means in the top of the apparatus for withdrawing gas from the apparatus, conduit means for conducting said gas from the top of the apparatus to the conduit between the pump and the said valve means, a float arranged to move in response to the surface of the liquid in the apparatus, and float controlled valve actuating means arranged to admit additional gas from said source when the liquid rises above a predetermined level between the top of said apparatus and the second outlet means, and to admit less gas when the liquid falls below said level.

5. In a countercurrent treating apparatus, a tower comprising a contact zone, means within said zone for aiding the contacting of liquids, means for introducing a liquid near one end of the zone, means for introducing a second liquid at an intermediate point of the zone, a gas nozzle in the zone in substantial spaced relation to the top of the zone, a source of gas, valve means for regulating the supply of gas, pump and conduit means connecting said nozzle and valve means for supplying gas to said nozzle, a first outlet means near the lower end of the zone for withdrawing a heavier liquid phase, a phase separator, a second outlet means near the top of said zone for withdrawing the lighter liquid phase from the zone and conducting it to the intermediate section of the separator, means for withdrawing liquid from the separator, outlet means in the top of the separator for withdrawing liquid freed gas from the separator, conduit means for conducting said gas from the separator to the conduit between the pump and the said valve means, a float arranged to move in response to the surface of the liquid in said separator, and float controlled valve actuating means arranged to admit additional gas from said source when the liquid rises above a predetermined level between the top of said separator and the liquid outlet means in the separator, and to admit less gas when the liquid falls below said level.

6. Countercurrent treating apparatus comprising a contact zone, means within said zone for aiding the contacting of liquids, means for introducing a liquid near one end of the zone, means for introducing a second liquid at an intermediate point of said zone, a gas nozzle in the zone in substantial spaced relation to the top of said zone, a source of gas, valve means for regulating the supply of gas, pump and conduit means connecting said nozzle and valve means for supplying gas to said gas nozzle, a first settling zone below and in direct communication with said contact zone, an outlet near the bottom of said first settling zone for withdrawing a heavier liquid phase, a second settling zone above said contact zone, baffle means arranged to cause substantially only liquid from the contact zone to enter the second settling zone at an intermediate level thereof, gas outlet means for said contact zone and for said second settling zone, an outlet near the top of said second settling zone and below the top of the liquid level for withdrawing a lighter phase, and means for returning a heavier phase from the lower portion of said second settling zone into said contact zone.

7. The process for bringing two at least partially immiscible liquids of different specific gravities into intimate contact which comprises: introducing the heavier and light liquids near the top and near the bottom, respectively, of a contact zone which is packed with means for aiding the contact of said liquids, maintaining the conditions of flow of the two liquids through the zone such as would cause channeling without gas agitation, introducing a current of inert gas near the lower end of said zone in a quantity sufficient to cause effective turbulence in said zone sufficient to prevent channeling but not sufficient to prevent countercurrent flow of the two liquids, removing gas from the upper portion of said zone, and removing the contacted liquids at opposite ends of the zone.

SIJBREN TIJMSTRA.